Patented Oct. 7, 1924.                                          1,510,652

UNITED STATES PATENT OFFICE.

SIDNEY M. CADWELL, OF LEONIA, NEW JERSEY, ASSIGNOR TO THE NAUGATUCK sub-divided into three smaller groups which are respectively

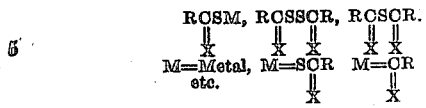

It will be noted that the group formulæ represent generally derivatives of carbon oxysulphide or carbon disulphide.

The formulæ of the first two groups mentioned, in which the first symbol R is any element except nitrogen, may be written

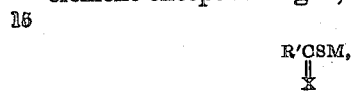

under which fall

where M is the metal and thiol salts are included, and

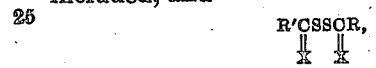

where M is equal to

and the disulphides are represented. The formula

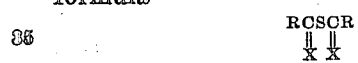

represents monosulphides which may be regarded as thiol acid anhydrides. R' in these formulæ designates any element except nitrogen.

In employing the first group of those mentioned above including substances having the formula

it has been found that M preferably represents either zinc or mercury in the mercuric state when vulcanization at ordinary temperatures is carried out, and when vulcanization above ordinary temperatures, the preferred metals are the following:—zinc, mercury, preferably in the mercuric state, lead, preferably in the plumbous state, cadmium, copper, preferably in the cupric state, arsenic, preferably in the arsenous state, manganese, preferably in the manganous state, so that the preferred formula for the thiol salts is

where M' represents one of the preferred metals given. M' may be substituted by any metal provided that one of the metals just mentioned is present in the combination either at some other position in the formula including

or to be introduced otherwise than as part of this compound. In connection with the other groups mentioned, namely, those represented by the formulæ

and

constituting respectively the disulphide and monosulphide groups, the presence of zinc or mercury in the mercuric state is preferable when vulcanization at ordinary temperatures is carried out. When vulcanization above ordinary temperatures is carried out the preferred metals are the following:—zinc, mercury, preferably in the mercuric state, lead, preferably in the plumbous state, cadmium, copper, preferably in the cupric state, arsenic, preferably in the arsenous state, manganese, preferably in the manganous state. As noted in connection with the first group, the metals employed with groups 2 and 3 may be present in any combined form.

In the table mentioned above, R and X are shown as represented by carbon, oxygen, nitrogen and sulphur, which are four of the more important elements occurring in organic compounds.

It will be understood that the invention is not limited to the species shown in the accompanying table, and that by substituting other elements than nitrogen, carbon, oxygen and sulphur for the symbol R or X, various other species may be formulated falling within the scope of the invention.

Although the various species disclosed are represented as symmetrical, it will be understood that unsymmetrical species also fall within the limits of the invention.

The table is:—

1,510,652
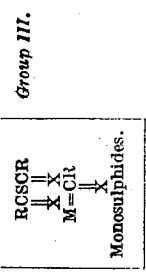
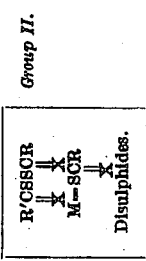
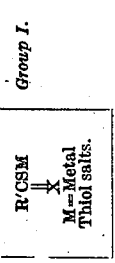
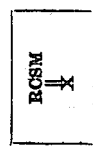

*Group III.*

Monosulphides.

In general it is to be noted in connection with members of this group that they are able to accelerate both hot vulcanization, that is, vulcanization at or above 240° F. and vulcanization below such temperatures and that they may be used for such vulcanization in thick masses of rubber, in thin sheets, or in cements. They are particularly adapted for accelerating hot vulcanization. Although active as accelerators they exhibit substantially no tendency to cause prevulcanization or "burning" by milling.

The general procedure for vulcanizing employing members of this group is as follows:—100 parts of rubber, 10 parts of zinc oxide, 3 parts of sulphur, and 0.1—3.0 parts of the accelerator are mixed. If hot vulcanization is employed the usual temperature or lower is used for periods of thirty minutes or more to complete vulcanization. The normal or usual temperatures of hot vulcanization are 240° F. or above. In cold vulcanization or vulcanization at lower temperatures than that employed for hot vulcanization the mixed materials are allowed to stand at ordinary room temperature for approximately one week when vulcanization is complete. In connection with curing at such temperatures, it is pointed out that the curing is effected in a longer time than is required in the use of members of Groups 1 and 2 set forth in my copending applications Serial Nos. 548,826, 548,827, 548,828 and 548,829.

The procedure given above may be employed with thin or thick masses of rubber, and in the case of cements where a solvent is used with the mixture, the procedure after mixing and evaporation of the solvent is substantially identical with that employed for thin masses of rubber. The group possesses the particular advantage that its members may be introduced into bulk rubber with practically no danger of prevulcanization or burning when milled. As pointed out above, a combined metal, preferably in the form of a metallic oxide such as zinc oxide, is employed in connection with members of this group. The oxides are generally designated as $M'_xO_y$, $M'$ having previously been defined. In general the use of bases, particularly amines, is preferred in connection with members of this group.

The action of the addition of primary and secondary amines to materials of this class has been found to be as follows: The acceleration by aliphatic amines is greatest when approximately one and one-half times the molecular weight of the amine on the basis of the molecular weight of the compound is used. An excess of primary aliphatic amine retards the cure considerably. An excess of secondary aliphatic amine retards the cure less. The greater the amount of primary aromatic amine added, the greater the acceleration. Tertiary amines have substantially no effect. Dibenzylamine has given excellent results in the acceleration of vulcanization according to the invention. Sodium hydroxide also accelerates the action of monosulphites.

*Species 38.*

As a specific embodiment of the invention which when employed in a process constituting the invention has provided good results, the following example is stated: 100 parts of rubber, 10 parts of zinc oxide, 3 parts of sulphur and 3 parts of thiol benzoic anhydride are mixed by milling in the usual manner and the mixture is vulcanized in a mold under 40 lbs. steam pressure for 10 minutes when vulcanization is complete. Vulcanization may be effected in open steam or air with approximately similar results and the time of vulcanization may be prolonged without damage to the mixture although, of course, the time of vulcanization will be dependent on the thickness of the material operated upon. The resulting product is odorless and colorless and has the usual excellent properties of rubber vulcanized with sulphur. As a specific example of curing below the normal hot vulcanization temperatures, the following procedure may be carried out: 100 parts of rubber, 10 parts of zinc oxide, 3 parts of sulphur, 2 parts of paratoluidine and 5 parts of thiol benzoic anhydride are mixed by milling in the usual manner and the mixture is vulcanized at 212° F. for 2 hours in open air. The formula for thiol benzoic anhydride is as follows:

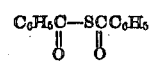

and along with this substance may be classified unsymmetrical compounds occupying midway position between species 37 and 38, namely:

Benzoylbutylxanthogenate.

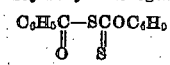

Benzoylethylxanthogenate.

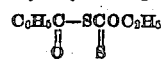

*Species 45.*

Members of this class include:

Diphenyldimethylthiurammonosulphide.
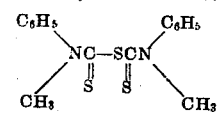

Tetramethylthiurammonosulphide.
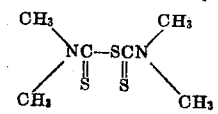

Tetraethylthiurammonosulphide.
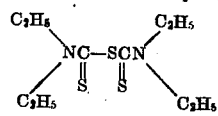

Diphenyldiethylthiurammonosulphide.
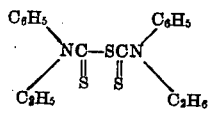

Tetrapropylthiurammonosulphide.
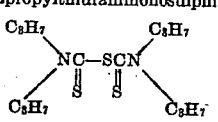

Ethylphenyldimethylthiurammonosulphide.
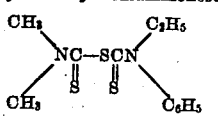

Methylphenylethylthiurammonosulphide.
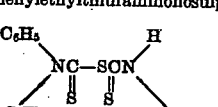

Phenylmethylcarbamylester of phenylmethyldithiocarbamic acid.
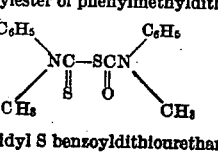

N-piperidyl S benzoyldithiourethane.
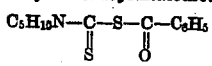

The above members are disclosed and claimed in co-pending applications Serial No. 548,826, filed April 1, 1922, and Serial No. 548,830, filed April 1, 1922.

It will be understood that the invention disclosed in co-pending application Serial No. 441,691, filed February 1, 1921, may be employed in connection with the accelerators disclosed and included in the invention of the present application.

It is to be understood that rubber substitutes, synthetic rubber, balata, gutta percha, etc., may be similarly treated instead of rubber and it is intended to include such processes in the claims hereto appended.

By the use of accelerators of this group vulcanization is accomplished in a rapid and efficient manner substantially without danger of "burning" or prevulcanization while milling, and the raw materials used for making the accelerators are inexpensive. The processes themselves are rapid and efficient and easily carried out. The products possess desirable physical characteristics, such as good tensile strength, resistance to ageing, resistance to flexing, and in general are free from the odor of vulcanizing ingredients.

It will thus be seen that among others the objects of the invention above enumerated are achieved. Although described herein no other species is claimed except those in the set made up of species 37, 38, 39 and 40.

As many apparently widely different embodiments of this invention may be made without departing from the spirit thereof, it will be understood that I do not intend to limit myself to the specific embodiment herein set forth except as indicated in the appended claims. Each of the substances enumerated herein as members of the various species has been employed in the vulcanization of rubber and has been found to accomplish vulcanization as indicated.

Having thus described my invention, what I claim and desire to protect by Letters Patent is:

1. A process of vulcanizing rubber or similar material which comprises combining with the rubber a vulcanizing agent and an accelerator comprising the group

and vulcanizing the rubber.

2. A process of vulcanizing rubber or similar material which comprises combining with the rubber a vulcanizing agent and an accelerator comprising the group

in the presence of a combined metal M', and vulcanizing the rubber.

3. A process of vulcanizing rubber or similar material which comprises combining with the rubber a vulcanizing agent and an accelerator comprising the group

and vulcanizing the rubber.

4. A process of vulcanizing rubber or similar material which comprises combining with the rubber a vulcanizing agent and an accelerator comprising the group

in the presence of a combined metal M', and vulcanizing the rubber.

5. A process of vulcanizing rubber or similar material which comprises combining with the rubber a vulcanizing agent, an accelerator comprising the group

and an amine, and vulcanizing the rubber.

6. A process of vulcanizing rubber or similar material which comprises combining with the rubber a vulcanizing agent, an accelerator comprising the group

in the presence of a combined metal M' and an amine, and vulcanizing the rubber.

7. A process of vulcanizing rubber or similar material which comprises combining with the rubber a vulcanizing agent, an accelerator comprising the group

and an amine, and vulcanizing the rubber.

8. A process of vulcanizing rubber or similar material which comprises combining with the rubber a vulcanizing agent, an accelerator comprising the group

in the presence of a combined metal M' and an amine, and vucanizing the rubber.

9. A process of vulcanizing rubber or similar material which comprises combining with the rubber a vulcanizing agent, an accelerator comprising the group

in the presence of combined zinc, and vulcanizing the rubber.

10. A process of vulcanizing rubber or similar material which comprises combining with the rubber a vulcanizing agent and an accelerator comprising the group

in the presence of combined zinc, and vulcanizing the rubber.

11. A process of vulcanizing rubber or similar material which comprises combining with the rubber a vulcanizing agent and a substance

and vulcanizing the rubber.

12. A process of vulcanizing rubber or similar material which comprises combining with the rubber a vulcanizing agent and a substance

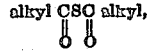

and vulcanizing the rubber.

13. A process of vulcanizing rubber or similar material which comprises combining with rubber thiol benzoic anhydride, and vulcanizing the rubber.

14. A process of vulcanizing rubber or similar material which comprises combining it with thiol benzoic anhydride in the presence of a combined metal M', and vulcanizing the rubber.

15. A process of vulcanizing rubber or similar material which comprises combining it with thiol benzoic anhydride in the presence of zinc, and vulcanizing the rubber.

16. A process of vulcanizing rubber or similar material which comprises combining it with thiol benzoic anhydride in the presence of zinc and an amine, and vulcanizing the rubber.

17. A process of vulcanizing rubber or similar material which comprises combining 100 parts of rubber, 10 parts of zinc oxide, 3 parts of sulphur, 3 parts of thiol benzoic anhydride, and vulcanizing the mixture under 40 lbs. steam pressure for approximately 10 minutes.

18. A vulcanized rubber derived from rubber or similar material combined with a vulcanizing agent and an accelerator comprising the group

19. A vulcanized rubber derived from rubber or similar material combined with a vulcanizing agent and an accelerator comprising the group

in the presence of a combined metal M'.

20. A vulcanized rubber derived from rubber or similar material combined with a vulcanizing agent and an accelerator comprising the group

21. A vulcanized rubber derived from rubber or similar material combined with a vulcanizing agent and an accelerator comprising the group

in the presence of a combined metal M'.

22. A vulcanized rubber derived from rubber or similar material combined with a vulcanizing agent, an accelerator comprising the group

and an amine.

23. A vulcanized rubber derived from rubber or similar material combined with a vulcanizing agent, an accelerator comprising the group

in the presence of a combined metal M' and an amine.

24. A vulcanized rubber derived from rubber or similar material combined with a vulcanizing agent, an accelerator comprising the group

and an amine.

25. A vulcanized rubber derived from rubber or similar material combined with a vulcanizing agent, an accelerator comprising the group

in the presence of a combined metal M' and an amine.

26. A vulcanized rubber derived from rubber or similar material combined with a vulcanizing agent, an accelerator comprising the group

in the presence of combined zinc.

27. A vulcanized rubber derived from rubber or similar material combined with a vulcanizing agent and an accelerator comprising the group

in the presence of combined zinc.

28. A vulcanized rubber derived from rubber or similar material combined with a vulcanizing agent and a substance

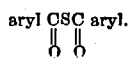

29. A vulcanized rubber derived from rubber or similar material combined with a vulcanizing agent and a substance

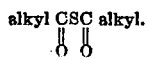

30. A vulcanized rubber derived from rubber or similar material combined with thiol benzoic anhydride.

31. A vulcanized rubber derived from rubber or similar material combined with thiol benzoic anhydride in the presence of a combined metal M'.

32. A vulcanized rubber derived from rubber or similar material combined with thiol benzoic anhydride in the presence of zinc.

33. A vulcanized rubber derived from rubber or similar material combined with thiol benzoic anhydride in the presence of zinc and an amine.

34. A rubber vulcanized under 40 lbs. steam pressure for approximately 10 minutes derived from rubber or similar material combined with 10 parts of zinc oxide, 3 parts of sulphur, 3 parts of thiol benzonic anhydride.

35. A process of vulcanizing rubber or similar material which comprises combining with the rubber a vulcanizing agent and an accelerator comprising the group

and vulcanizing the rubber at a temperature below the normal hot vulcanization temperature.

36. A process of vulcanizing rubber or similar material which comprises combining with the rubber a vulcanizing agent and an accelerator comprising the group

in the presence of a combined metal M', and vulcanizing the rubber at a temperature below the normal hot vulcanization temperature.

37. A process of vulcanizing rubber or similar material which comprises combining with the rubber a vulcanizing agent and an accelerator comprising the group

in the presence of combined zinc, and vulcanizing the rubber at a temperature below the normal hot vulcanization temperature.

38. A process of treating rubber or similar material comprising combining it with a vulcanizing agent and thiol benzoic anhydride in the presence of combined zinc, and vulcanizing the rubber at a temperature below the normal hot vulcanization temperature.

39. A process of treating rubber or similar material comprising combining it with a vulcanizing agent and thiol benzoic anhydride and an amine, and vulcanizing the rubber at a temperature below the normal hot vulcanization temperature.

40. A rubber vulcanized at a temperature below the normal hot vulcanization temperature derived from rubber combined with an accelerator comprising the group

41. A rubber vulcanized at a temperature below the normal hot vulcanization temperature derived from rubber combined with an accelerator comprising the group

in the presence of a combined metal M'.

42. A rubber vulcanized at a temperature below the normal hot vulcanization temperature derived from rubber combined with an accelerator comprising the group

in the presence of combined zinc.

43. A rubber vulcanized at a temperature below the normal hot vulcanization temperature derived from rubber combined with thiol benzoic anhydride in the presence of combined zinc.

44. A rubber vulcanized at a temperature below the normal hot vulcanization temperature derived from rubber combined with thiol benzoic anhydride in the presence of combined zinc and an amine.

Signed at New York, New York, this 31st day of March, 1922.

SIDNEY M. CADWELL.